United States Patent
Koyama

(10) Patent No.: US 7,556,299 B2
(45) Date of Patent: Jul. 7, 2009

(54) FINGER UNIT AND MULTI-FINGER GRASPING MECHANISM

(75) Inventor: Junji Koyama, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 371 days.

(21) Appl. No.: 10/584,761

(22) PCT Filed: Mar. 30, 2004

(86) PCT No.: PCT/JP2004/004564

§ 371 (c)(1), (2), (4) Date: Jun. 27, 2006

(87) PCT Pub. No.: WO2005/102619

PCT Pub. Date: Nov. 3, 2005

(65) Prior Publication Data

US 2007/0063523 A1 Mar. 22, 2007

(51) Int. Cl.
*B25J 17/00* (2006.01)
*B25J 15/10* (2006.01)

(52) U.S. Cl. .................... 294/106; 294/907; 901/38; 901/39; 901/46

(58) Field of Classification Search ........... 294/106, 294/907; 901/31–34, 38, 39, 46; 623/64
See application file for complete search history.

(56) References Cited

U.S. PATENT DOCUMENTS

| | | | | |
|---|---|---|---|---|
| 2,390,293 A | * | 12/1945 | Colson | 294/86.41 |
| 2,959,444 A | * | 11/1960 | Callender | 294/86.4 |
| 3,025,097 A | * | 3/1962 | Sherron | 294/88 |
| 3,952,880 A | * | 4/1976 | Hill et al. | 414/5 |
| 4,332,066 A | * | 6/1982 | Hailey et al. | 29/26 R |
| 4,551,058 A | * | 11/1985 | Mosher | 414/735 |
| 5,088,171 A | * | 2/1992 | Suzuki | 29/26 A |
| 5,437,490 A | | 8/1995 | Mimura et al. | |
| 7,077,446 B2 | * | 7/2006 | Kameda et al. | 294/106 |

FOREIGN PATENT DOCUMENTS

| | | |
|---|---|---|
| JP | 63-62686 A | 3/1988 |
| JP | 2002-264066 A | 9/2002 |
| JP | 2004-122339 A | 4/2004 |
| JP | 2004-181610 A | 7/2004 |

\* cited by examiner

*Primary Examiner*—Dean J Kramer
(74) *Attorney, Agent, or Firm*—Buchanan Ingersoll & Rooney PC

(57) ABSTRACT

A multi-finger grasping mechanism (300), comprising three two-joint finger units (1-1 to 1-3). Each two-joint finger unit further comprises a finger root part (2), a finger root side joint part (5), a finger intermediate part (3), a finger tip side joint part (6), and a finger tip part (4). The finger intermediate part (3) can be swung about the joint axis (5*a*) of the finger root side joint part (5), and the finger tip part (4) can be swung about the joint axis (6*a*) of the finger tip side joint part (6). The finger tip part (4) can be swung about the center axis thereof. When a bolt (W) is held by the finger tip part (4) and the finger part (4) is rotated, the tightening operation of the bolt (W) can be performed.

19 Claims, 5 Drawing Sheets

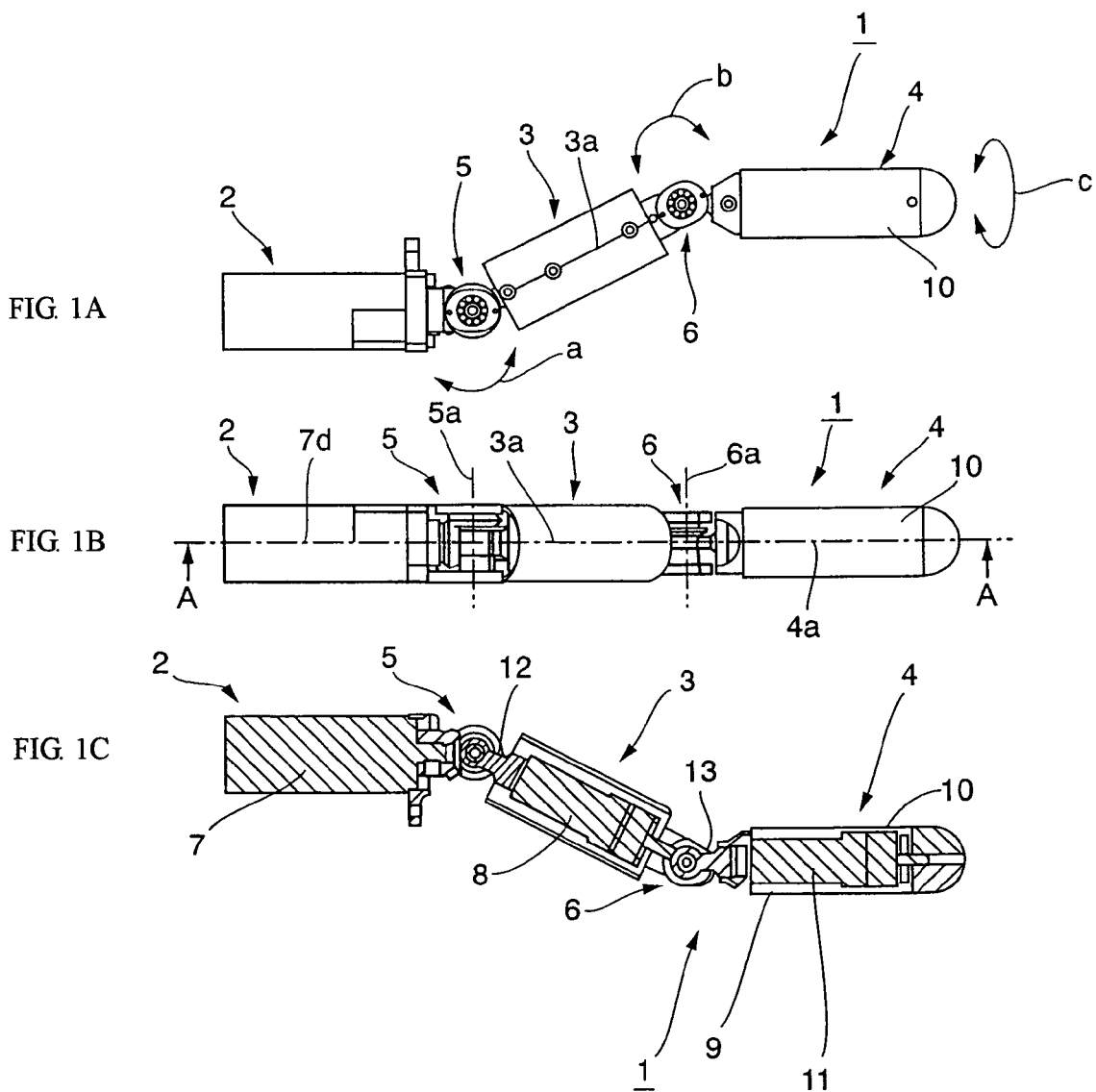

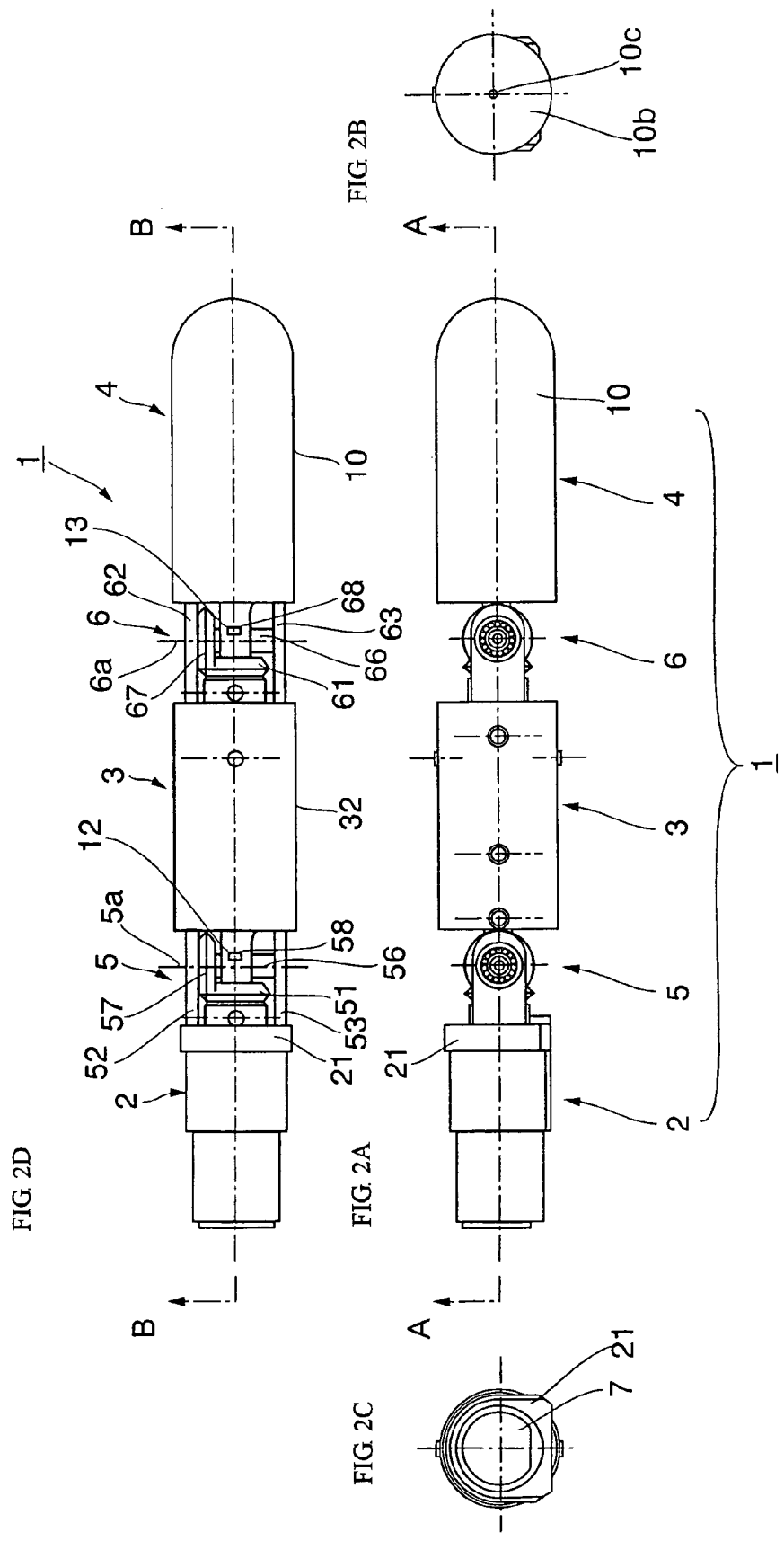

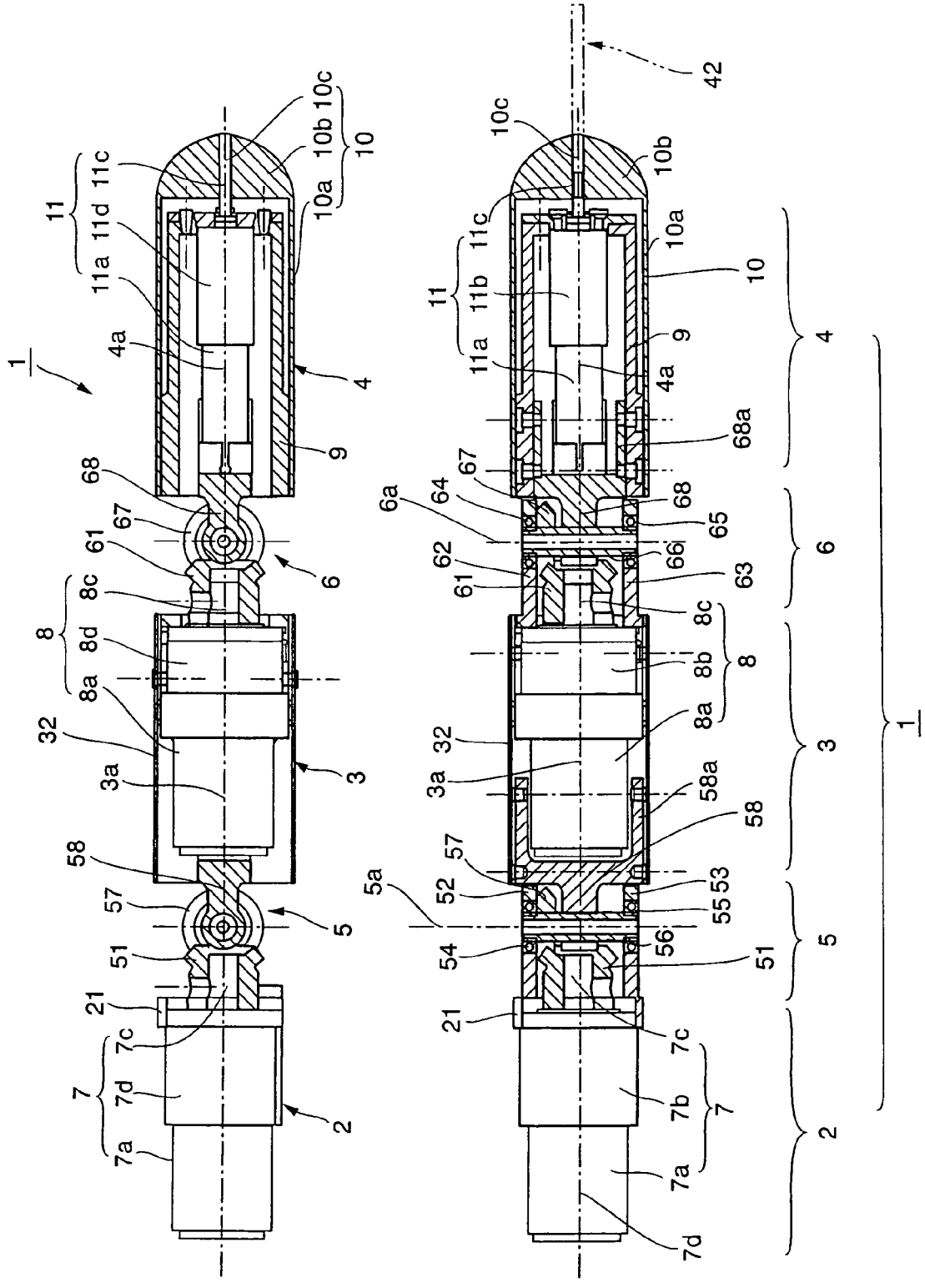

FINGER UNIT AND MULTI-FINGER GRASPING MECHANISM

TECHNICAL FIELD

The present invention relates to a finger unit used in a robot hand or the like that is suitable for grasping components of various shapes and materials and performing various other operations; and also to a multi-finger type holding mechanism comprising such finger units.

BACKGROUND ART

The grasping mechanism of a robot hand commonly has a structure comprising finger units structured from multiple joints. It is possible to grasp components, to move components, to mount components, and to perform other such operations by driving the finger units simultaneously or individually.

However, conventional grasping mechanisms are assumed to be used to handle predetermined components of a specified shape or a specified material, and have the drawback of lacking versatility. The operations that can be performed are limited, and the designated grasping mechanisms must be exchanged with each type of operation.

DISCLOSURE OF THE INVENTION

In view of these circumstances, an object of the present invention is to provide a grasping mechanism provided with highly versatile grasping functionality.

Another object of the present invention is to provide a grasping mechanism provided with highly versatile operating functionality.

Yet another object of the present invention is to provide a finger unit that can be used in a grasping mechanism comprising a highly versatile grasping functionality and operating functionality.

Aimed at resolving the stated problems, the finger unit of the present invention is characterized in comprising:

a finger root part, a fingertip part, and a joint part for linking the finger root part and the fingertip part, wherein the joint part supports the fingertip part revolvably around a joint axial line that is orthogonal to a center axis of the fingertip part;

the finger root part comprises a joint driving actuator for revolving the fingertip part around the joint axial line; and the fingertip part comprises a revolving member that is supported in a revolvable state by the joint part, a rotating member that is supported in a state of rotation around the center axis of the fingertip part by the revolving member, and a rotation drive actuator for rotating the rotating member, wherein the rotation drive actuator is supported by the revolving member.

It is preferable that the joint part comprises a strain gauge or other torque sensor for sensing the torque transmitted via the joint part.

Also, the finger root part can comprise the joint driving actuator, and a mounting flange on which the joint driving actuator is mounted.

The joint part can comprise a drive-side bevel gear that is coaxially fixed in place at a distal end of a rotation output axle of the joint driving actuator, a pair of bearing housings that extend from the front surface of the mounting flange through both sides of the drive-side bevel gear and protrude forward, bearings that are mounted in the bearing housings, a joint axle that is rotatably supported at both ends by the bearings and that is aligned in a direction orthogonal to the center axis of the rotation output axle of the joint driving actuator, a driven-side bevel gear that is coaxially fixed in place to the joint axle and that is meshed with the drive-side bevel gear, and a linking member that is fixed in place at one end to the joint axle and that extends in a direction orthogonal to the joint axle.

In this case, the revolving member of the fingertip part can be linked to the linking member. It is also preferable that the joint axle be a hollow joint axle comprising a hollow part for wiring.

Furthermore, the torque transmitted via the joint part can be sensed by mounting a strain gauge for sensing the torque transmitted via the linking member. The gauge is mounted on the side surface of the linking member.

In the finger unit of the present invention, the rotating member of the fingertip part can be used as the outer casing of the fingertip part. A drill, driver bit, or other operating tool can also be coaxially mounted on the rotating member of the fingertip part.

The present invention further relates to a multi-joint finger unit characterized in comprising:

a finger root part, a finger intermediate part, a fingertip part, a finger-root-side joint part for linking the finger root part and the finger intermediate part, and a fingertip-side joint part for linking the finger intermediate part and the fingertip part, wherein the finger-root-side joint part supports the finger intermediate part revolvably around a center of a finger-root-side joint axial line that is orthogonal to a center axis of the finger intermediate part;

the finger root part comprises a finger-root-side joint driving actuator for revolving the finger intermediate part around the finger-root-side joint axial line;

the fingertip-side joint part supports the fingertip part revolvably around a fingertip-side joint axial line that is orthogonal to a center axis of the fingertip part;

the finger intermediate part comprises a fingertip-side joint driving actuator for revolving the fingertip part around the fingertip-side joint axial line; and the fingertip part comprises a revolving member that is supported in a revolvable state by the fingertip-side joint part, a rotating member that is supported in a state of rotation around the center axis of the fingertip part by the revolving member, and a rotation drive actuator for rotating the rotating member, wherein the rotation drive actuator is supported by the revolving member.

It is preferable that the fingertip-side joint part and the finger-root-side joint part comprise a strain gauge or other torque sensor for sensing the torque transmitted via these joint parts.

Also, in order to configure a finger unit comprising three or more joints, a configuration can be used that comprises a plurality of finger intermediate portions as the finger intermediate part, and an intermediate joint part that links together these finger intermediate parts; or a configuration can be used wherein the finger intermediate portion nearest to the fingertip is supported by the intermediate joint part in a revolvable state around a joint axial line that is orthogonal to a center axis of the intermediate portion. This configuration comprises, as the finger intermediate portion nearest to the finger root, an intermediate joint driving actuator for revolving the finger intermediate portion nearest to the fingertip around the joint axial line.

In this case, it is preferable that the intermediate joint part also comprise a strain gauge or other torque sensor for sensing the torque transmitted via the intermediate joint part.

The finger root part can comprise a mounting flange and a finger-root-side joint driving actuator mounted on this mounting flange.

The finger-root-side joint part can comprise a drive-side bevel gear that is coaxially fixed in place at a distal end of a rotation output axle of the finger-root-side joint driving actuator, a pair of bearing housings that extend from the front surface of the mounting flange through both sides of the drive-side bevel gear and protrude forward, bearings that are mounted in the bearing housings, a joint axle that is rotatably supported at both ends by the bearings and that is aligned in a direction orthogonal to the center axis of the rotation output axle of the finger-root-side joint driving actuator, a driven-side bevel gear that is coaxially fixed in place to the outer peripheral surface of the joint axle and that is meshed with the drive-side bevel gear, and a linking member that is fixed in place at one end to the joint axle and that extends in a direction orthogonal to the joint axle. In this case, the revolving member of the finger intermediate part is linked to the linking member. It is also preferable that a strain gauge for sensing the torque transmitted via the linking member be mounted on the side surface of the linking member. Furthermore, it is also preferable that the joint axle be a hollow joint axle comprising a hollow part for wiring.

Next, the fingertip-side joint axle can comprise a drive-side bevel gear that is coaxially fixed in place at a distal end of a rotation output axle of the fingertip-side joint driving actuator that protrudes from the finger intermediate part towards the fingertip, a pair of bearing housings that are linked to the revolving member of the finger intermediate part and that extend through both sides of the drive-side bevel gear and protrude forward, bearings that are mounted in the bearing housings, a joint axle that is rotatably supported at both ends by the bearings and that is aligned in a direction orthogonal to the center axis of the rotation output axle of the fingertip-side joint driving actuator, a driven-side bevel gear that is coaxially fixed in place to the outer peripheral surface of the joint axle and that is meshed with the drive-side bevel gear, and a linking member that is fixed in place at one end to the joint axle and that extends in a direction orthogonal to the joint axle. In this case as well, the revolving member of the fingertip part is linked to the linking member. Also, a strain gauge for sensing the torque transmitted via the linking member can be mounted on the side surface of the linking member. Furthermore, the joint axle can be a hollow joint axle comprising a hollow part for wiring.

The rotating member of the fingertip part can be used as the outer casing of the fingertip part. A drill, a driver bit, or other operating tool can also be coaxially mounted on the rotating member.

The present invention relates to a multi-joint type grasping mechanism characterized in comprising a plurality of finger units having the configuration described above.

The multi-joint grasping mechanism of the present invention can comprise at least three finger units and a common finger unit mounting plate on which the finger units are supported.

In cases in which the outer casings of the fingertip parts of the finger units rotate in this configuration, screws, bolts, and other such items can be grasped by these fingertip parts and can be screwed into screw holes or bolt holes. Also, hole punching operations can be performed in cases in which drills are mounted on the rotating members of the fingertip parts. Furthermore, in cases in which, for example, a driver bit is mounted on the rotating member of a fingertip part, all of the finger units except for one finger unit are used to grasp a screw or bolt or the like and position it at a screw hole or bolt hole.

In this state, the driver bit mounted on the fingertip part of the one finger unit can be used to fasten the screw or bolt.

BRIEF DESCRIPTION OF THE DRAWINGS

FIGS. 1A, 1B, and 1C are, respectively, a side view, a plan view, and a schematic cross-sectional view depicting a double-joint type finger unit in which the present invention is applied;

FIGS. 2A through 2D are, respectively, a plan view, a front view, a back view, and a side view depicting an example of the double-joint type finger unit in FIG. 1;

FIGS. 3A and 3B are cross-sectional views depicting, respectively, a cross section along line A-A in FIG. 2 and a cross section along line B-B in FIG. 2;

BEST MODE FOR CARRYING OUT THE INVENTION

Figure 4A:
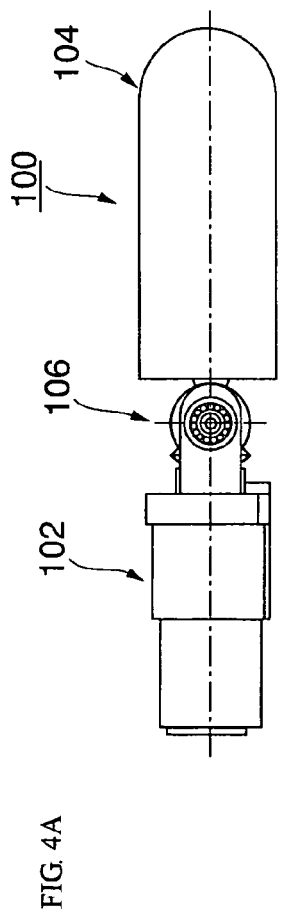
FIG. 4A is a plan view depicting an example of a single-joint type finger unit.

Embodiments of the present invention will now be described with reference to the drawings.

(Double-Joint Finger Unit)

FIGS. 1A through 1C are, respectively, a side view, a plan view, and a schematic cross-sectional view of a double-joint finger unit in which the present invention is applied. A double-joint finger unit 1 of the present example is configured from a finger root part 2, a finger intermediate part 3, a fingertip part 4, a finger-root-side joint part 5 for linking the finger root part 2 and the finger intermediate part 3, and a fingertip-side joint part 6 for linking the finger intermediate part 3 and the fingertip part 4.

The finger-root-side joint part 5 supports the finger intermediate part 3 in a state revolvable within a specified angle range, as shown by the arrow a, around a joint axial line 5a orthogonal to a center axis 3a of the finger intermediate part. Similarly, the fingertip-side joint part 6 supports the fingertip part 4 in a state revolvable within a specified angle range, as shown by the arrow b, around a joint axial line 6a orthogonal to a center axis 4a of the fingertip part 4. In the present example, the joint axial lines 5a and 6a are vertical lines, and the finger intermediate part 3 and fingertip part 4 are capable of revolving individually to the left and right in the same horizontal plane.

The finger root part 2 comprises a finger-root-side joint driving actuator 7 for revolving the finger intermediate part 3 around the joint axial line 5a. The finger intermediate part 3 comprises a fingertip-side joint driving actuator 8 for revolving the fingertip part 4 around the joint axial line 6a.

The fingertip part 4 of the present example comprises a revolving tube 9 (revolving member) supported in a revolvable state by the fingertip-side joint part 6. A fingertip outer casing (rotating member) 10 is supported by the outer peripheral surface of this revolving tube 9 in a rotatable state around the center axis 4a of the fingertip part 4 as shown by the arrow c. Also, a rotation drive actuator 11 for rotating the fingertip outer casing 10 is disposed coaxially inside the fingertip outer casing 10, and the rotation drive actuator 11 is coaxially mounted inside the revolving tube 9.

A torque sensor for sensing the torque transmitted via the finger-root-side joint part 5 and the fingertip-side joint part 6 is disposed in each of these joint parts. In the present example, strain gauges 12, 13 are mounted on the joint parts 5, 6.

FIGS. 2A through 2D are, respectively, a plan view, a front view, a back view, and a side view of the double-joint finger unit 1. FIGS. 3A and 3B are cross-sectional views depicting, respectively, a cross section along line A-A in FIG. 2 and a cross section along line B-B in FIG. 2. The structures of the components in the double-joint finger unit I will now be described with reference to these diagrams.

First, the finger root part 2 comprises a mounting flange 21 at the front end (the end nearer to the fingertip), and this mounting flange 21 is mounted, for example, perpendicularly to a supporting member (not shown) on the stationary side. The finger-root-side joint driving actuator 7 is mounted horizontally on the mounting flange 21 and faces forward. A rotation output axle 7c of the finger-root-side joint driving actuator 7 protrudes farther forward than the mounting flange 21.

The finger-root-side joint driving actuator 7 is configured, for example, from a coaxially linked motor 7a and reduction gear 7b. A wave reduction gear, composed of a toric rigid internal gear, a flexible external gear disposed on the inner side thereof, and a wave generator fitted on the inner side thereof, can be used as the reduction gear 7b. The wave generator causes the flexible external gear to flex in the radial direction and partially mesh with the rigid internal gear, and when the wave generator is rotated by the motor 7a, the positions where the two gears mesh move circumferentially, and a reduced rotational speed output, which has reduced at a rate corresponding to the difference in the number of teeth between the two gears, is outputted from the rotation output axle 7c. Wave reduction gears are conventionally known, and additional descriptions are therefore omitted.

The finger-root-side joint part 5 linked to the front end of the finger root part 2 comprises a drive-side bevel gear 51 that is coaxially fixed in place at the distal end of the rotation output axle 7c, and a pair of bearing housings 52, 53 that extend from the front surface of the mounting flange 21 through the top and bottom of the drive-side bevel gear 51 and protrude forward. Bearings 54, 55 are mounted in both of these bearing housings 52, 53, respectively, and a hollow joint axle 56 is vertically and rotatably supported at both ends by the bearings 54, 55. The center axis of this joint axle 56 is a joint axial line 5a, and this joint axial line 5a is orthogonal to a center axis 7d of the rotation output axle 7c of the finger-root-side joint driving actuator 7. A driven-side bevel gear 57 is coaxially fixed in place at the top end of the joint axle 56, and is meshed with the drive-side bevel gear 51. The back end of a linking member 58, which is oriented forward and is extended horizontally, is fixed in place in the vertical middle of the joint axle 56. The strain gauge 12 is mounted on the side surface of the linking member 58. The forward portion of the linking member 58 constitutes an arm portion 58a that is vertically divided into two parts.

The finger intermediate part 3 comprises a rearward portion of the fingertip-side joint driving actuator 8, which is fixed in place between the top and bottom of the arm portion 58a of the linking member 58. The fingertip-side joint driving actuator 8 is also configured from a motor 8a and a reduction gear 8b, similar to the finger-root-side joint driving actuator 7. A torus-shaped finger intermediate part outer casing 32 is mounted on these members 58a, 8 so as to cover the arm portion 58a of the linking member 58 and the actuator 8. A rotation output axle 8c protrudes forward from the front end of the fingertip-side joint driving actuator 8.

Next, the fingertip-side joint part 6 has a structure similar to the finger-root-side joint part 5 described above. Specifically, this joint part comprises a drive-side bevel gear 61 that is coaxially fixed in place at the distal end of the rotation output axle 8c of the fingertip-side joint driving actuator 8, which protrudes towards the fingertip from the finger intermediate part 3, and a pair of bearing housings 62, 63 that extend from the front end of the actuator 8 through the top and bottom of the drive-side bevel gear 61 and protrude forward. Bearings 64, 65 are mounted in each of these bearing housings 62, 63, respectively, and a hollow joint axle 66 is vertically and rotatably supported at both ends by the bearings 64, 65. The center axis of this joint axle 66 is a joint axial line 6a, and this joint axial line 6a is orthogonal to a center axis (the center axis 3a of the finger intermediate part 3) of the rotation output axle 8c of the fingertip-side joint driving actuator 8. A driven-side bevel 67 is coaxially fixed in place at the top end of the joint axle 66, and is meshed with the drive-side bevel gear 61. The back end of a linking member 68, which is oriented forward and is extended horizontally, is fixed in place in the vertical middle of the joint axle 66. The strain gauge 13 is mounted on the side surface of the linking axle 68.

The revolving tube 9 of the fingertip part 4 is mounted on the top and bottom of the arm portion 68a on the front side of the linking axle 68. The rotation drive actuator 11 is coaxially fixed in place inside the revolving tube 9. The fingertip outer casing 10 of the present example is formed from a cylindrical portion 10a that is rotatably supported by the outer peripheral surface of the revolving tube 9 so as to cover the entire revolving tube 9, and from a semispherical distal end portion 10b that is formed at the front end of the cylindrical portion 10a. A center hole 10c is formed in the semispherical distal end portion 10b, and a rotation output axle 11c of the actuator 11 is inserted through and fixed in place in this center hole. The actuator 11 is also configured from a motor 11a and a reduction gear 11b, similar to the actuators 7, 8 described above.

A drill, driver bit, or other rotary tool 42 can-be inserted into the center hole 10c of the semispherical distal end portion 10b from the front, and can be linked and fixed in place to the rotation output axle 11c, as shown by the transparent lines in FIG. 3.

(Other Examples of Finger Unit)

FIG. 4A depicts an example of a single-joint finger unit. A single-joint finger unit 100 comprises a finger root part 102, a fingertip part 104, and a joint part 106 for linking the finger root part 102 and the fingertip part 104. The finger root part 102 can be configured similar to the finger root part 2 described above, the fingertip part 104 can be configured similar to the fingertip part 4 described above, and the joint part 106 can be configured similar to the joint part 6 described above.

Figure 4B:
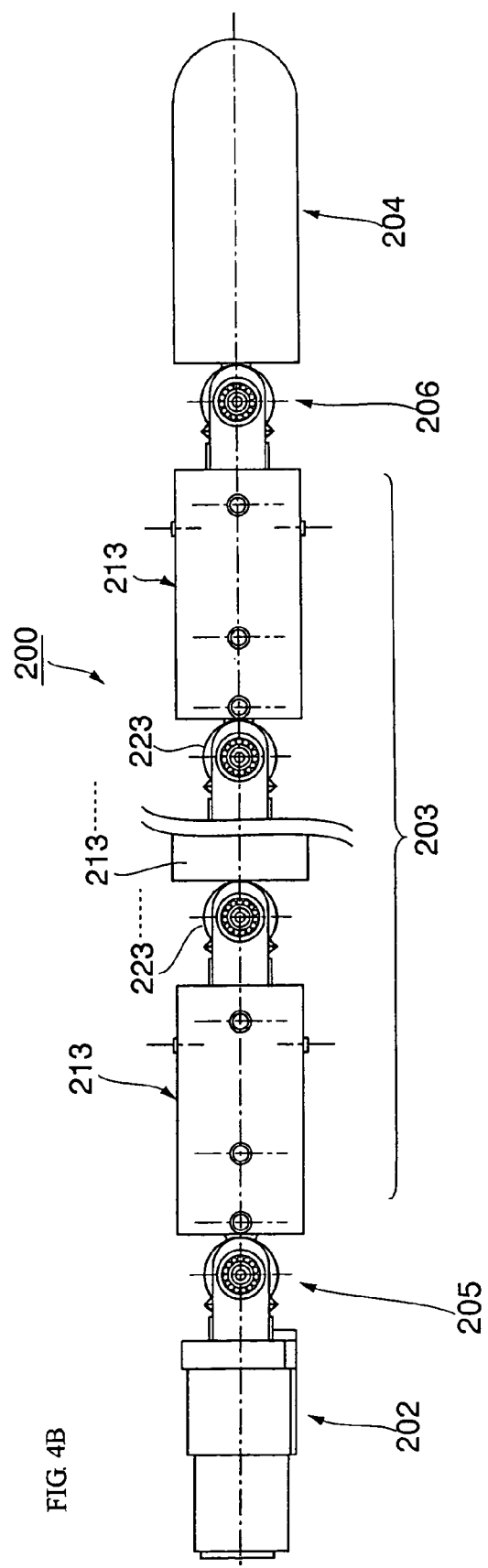
FIG. 4B is a plan view depicting an example of a multi-joint finger unit comprising three or more joints.

FIG. 4B shows an example of a multi-joint finger unit comprising three or more joints. A multi-joint finger unit 200 comprises a finger root part 202, a finger intermediate part 203, a fingertip part 204, a finger-root-side joint part 205, and a fingertip-side joint part 206. The finger intermediate part 203 comprises finger intermediate portions 213, and intermediate joint parts 223 that link these finger intermediate portions 213 together. The finger root part 202 can be configured similar to the finger root part 2 described above, the finger intermediate portions 213 can be configured similar to the finger intermediate part 3 described above, and the fingertip part 204 can be configured similar to the fingertip part 4 described above. Also, the fingertip-side joint part 204 and the intermediate joint parts 223 can be configured similar to the finger-root-side joint part 5 described above, and the fingertip-side joint part 206 can be configured similar to the fingertip-side joint part 6 described above.

(Multi-Finger Grasping Mechanism)

Figure 5B:
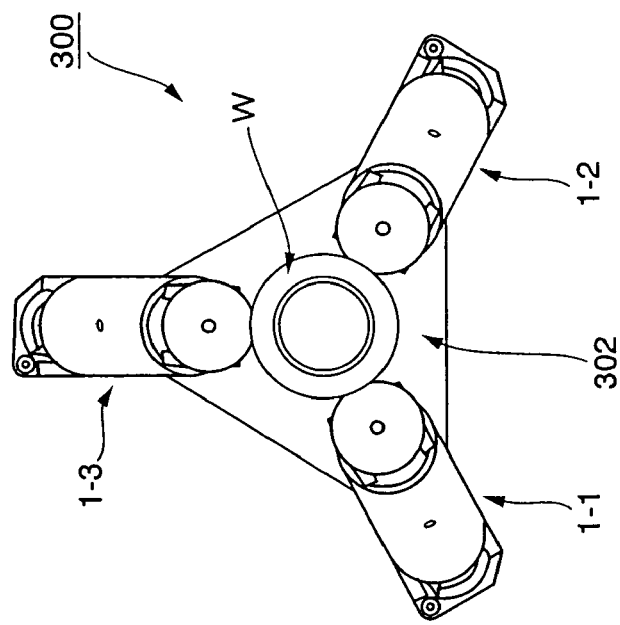
FIGS. 5A and 5B are, respectively, a perspective view and a plan view depicting an example of a multi-finger grasping mechanism comprising three of the double-joint finger units in FIG. 1.
Figure 5A:
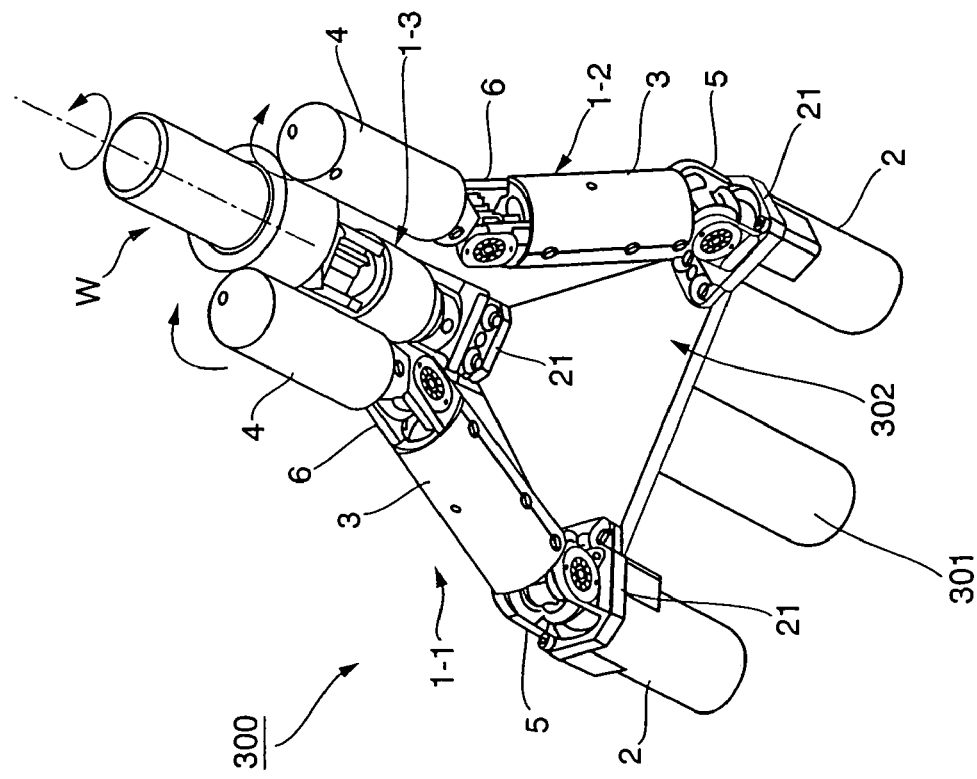

FIGS. 5A and 5B are, respectively, a perspective view and a plan view depicting an example of a multi-finger grasping mechanism comprising three of the double-joint finger units depicted in FIGS. 1 through 3. A multi-finger grasping mechanism 300 of the present example has three double-joint finger units 1-1, 1-2, 1-3 that have the same structure. These double-joint finger units 1-1 through 1-3 are fixed in place at the three corners of a triangular common mounting plate 302 that comprises a support 301. Specifically, a mounting flange 21 for the double-joint finger units 1-1 through 1-3 is fixed in place at each corner of the common mounting plate 302. As a result, the fingertip parts 4 of the double-joint finger units 1-1 through 1-3 can be opened and closed, and bolts, screws, and other such items W can be grasped in the middle. Also, if an item W is grasped while the fingertip parts 4 are kept parallel, and the fingertip parts 4 are rotated in this state, then the item W can be rotated around the center axis. Consequently, bolts and screws and the like can be screwed into bolt holes and screw holes.

INDUSTRIAL APPLICABILITY

As described above, the finger unit of the present invention is designed so that the fingertip part can be rotated around a center axis. Therefore, if a drill, driver bit, or other rotary tool is mounted at the distal end, holes can be drilled, threads can be formed, and the like. Also, a multi-finger grasping mechanism comprising finger units can grasp items of various shapes and materials. In addition to grasping and moving items, the mechanism can also position bolts and screws and the like in front of bolt holes and screw holes, and can screw the items into these holes.

Consequently, the present invention makes it possible to obtain a finger unit and a multi-finger grasping mechanism provided with highly versatile grasping functionality and highly versatile operating functionality.

Also, the finger units can be appropriately driven on the basis of the torque sensed by strain gauges or other such torque sensors mounted in the joint parts.

The invention claimed is:

1. A finger unit comprising: a finger root part, a fingertip part, and a joint part for linking the finger root part and the fingertip part; wherein the joint part supports the fingertip part revolvably around a joint axial line that is orthogonal to a center axis of the fingertip part; the finger root part comprises a joint driving actuator for revolving the fingertip part around the joint axial line; and the fingertip part comprises a revolving member that is supported in a revolvable state by the joint part, a rotating member that is supported in a state of rotation around the center axis of the fingertip part by the revolving member, and a rotation drive actuator for rotating the rotating member, wherein the rotation drive actuator is supported by the revolving member;

wherein the finger root part comprises a mounting flange and the joint driving actuator mounted on the mounting flange; and the joint part comprises a drive-side bevel gear that is coaxially fixed in place at a distal end of a rotation output axle of the joint driving actuator, a pair of bearing housings that extend from a front surface of the mounting flange through both sides of the drive-side bevel gear and protrude forward, bearings that are mounted in the bearing housings, a joint axle that is rotatably supported at both ends by the bearings and that is aligned in a direction orthogonal to the center axis of the rotation output axle of the joint driving actuator, a driven-side bevel gear that is coaxially fixed in place to the joint axle and that is meshed with the drive-side bevel gear, and a linking member that is fixed in place at one end to the joint axle and that extends in a direction orthogonal to the joint axle; wherein the revolving member of the fingertip part is linked to the linking member.

2. The finger unit according to claim 1, wherein the joint axle is a hollow joint axle comprising a hollow part for wiring.

3. The finger unit according to claim 2, wherein the rotating member of the fingertip part is a cylindrical outer casing of the fingertip part.

4. The finger unit according to claim 1, wherein a drill, driver bit, or other operating tool is coaxially mounted on the rotating member of the fingertip part.

5. A multi-finger grasping mechanism having a plurality of finger units, wherein each of the finger units is the finger unit according to claim 1.

6. A multi-joint finger unit comprising: a finger root part, a finger intermediate part, a fingertip part, a finger-root-side joint part for linking the finger root part and the finger intermediate part, and a fingertip-side joint part for linking the finger intermediate part and the fingertip part; wherein the finger-root-side joint part supports the finger intermediate part revolvably around a joint axial line that is orthogonal to a center axis of the finger intermediate part; the finger root part comprises a finger-root-side joint driving actuator for revolving the finger intermediate part around the joint axial line; the fingertip-side joint part supports the fingertip part revolvably around a joint axial line that is orthogonal to a center axis of the fingertip part; the finger intermediate part comprises a fingertip-side joint driving actuator for revolving the fingertip part around the joint axial line; and the fingertip part comprises a revolving member that is supported in a revolvable state by the fingertip-side joint part, a rotating member that is supported in a state of rotation around the center axis of the fingertip part by the revolving member, and a rotation drive actuator for rotating the rotating member, wherein the rotation drive actuator is mounted on the revolving member;

wherein the finger root part comprises a mounting flange and the finger-root-side joint driving actuator mounted on the mounting flange; and the finger-root-side joint part comprises a drive-side bevel gear that is coaxially fixed in place at a distal end of a rotation output axle of the finger-root-side joint driving actuator, a pair of bearing housings that extend from the front surface of the mounting flange through both sides of the drive-side bevel gear and protrude forward, bearings that are mounted in the bearing housings, a joint axle that is rotatably supported at both ends by the bearings and that is aligned in a direction orthogonal to the center axis of the rotation output axle of the finger-root-side joint driving actuator, a driven-side bevel gear that is coaxially fixed in place to the outer peripheral surface of the joint axle and that is meshed with the drive-side bevel gear, and a linking member that is fixed in place at one end to the joint axle and that extends in a direction orthogonal to the joint axle; wherein the revolving member of the intermediate part is linked to the linking member.

7. The multi-joint finger unit according to claim 6, wherein the joint axle is a hollow joint axle comprising a hollow part for wiring.

8. The multi-joint finger unit according to claim 7, wherein the rotating member of the fingertip part is a cylindrical outer casing of the fingertip part.

9. The multi-joint finger unit according to claim 6, wherein a drill, driver bit, or other operating tool is coaxially mounted on the rotating member of the fingertip part.

10. A multi-finger grasping mechanism having a plurality of multi-joint finger units, wherein each of the multi-joint finger units is the multi-joint finger unit according to claim 6.

11. The multi-finger grasping mechanism according to claim 10, comprising: at least three of the multi-joint finger units; and a common finger unit mounting plate on which the multi-joint finger units are supported.

12. A multi-joint finger unit comprising: a finger root part, a finger intermediate part, a fingertip part, a finger-root-side joint part for linking the finger root part and the finger intermediate part, and a fingertip-side joint part for linking the finger intermediate part and the fingertip part; wherein the finger-root-side joint part supports the finger intermediate part revolvably around a joint axial line that is orthogonal to a center axis of the finger intermediate part; the finger root part comprises a finger-root-side joint driving actuator for revolving the finger intermediate part around the joint axial line; the fingertip-side joint part supports the fingertip part revolvably around a joint axial line that is orthogonal to a center axis of the fingertip part; the finger intermediate part comprises a fingertip-side joint driving actuator for revolving the fingertip part around the joint axial line; and the fingertip part comprises a revolving member that is supported in a revolvable state by the fingertip-side joint part, a rotating member that is supported in a state of rotation around the center axis of the fingertip part by the revolving member, and a rotation drive actuator for rotating the rotating member, wherein the rotation drive actuator is mounted on the revolving member;

wherein the fingertip-side joint part comprises: a drive-side bevel gear that is coaxially fixed In place at a distal end of a rotation output axle of the fingertip-side joint driving actuator that protrudes from the finger intermediate part towards the fingertip part; a pair of bearing housings that are linked to the removing member of the finger Intermediate part and that extend through both sides of the drive-side bevel gear and protrude forward; bearings that are mounted In the bearing housings; a joint axle that is rotatably supported at both ends by the bearings and that is aligned In a direction orthogonal to the center axis of the rotation output axle of the fingertip-side joint driving actuator; a driven-side bevel gear that is coaxially fixed In place to the outer peripheral surface of the joint axle and that is meshed with the drive-side bevel gear; and a linking member that is fixed in place at one end to the joint axle and that extends in a direction orthogonal to the joint axle; wherein the revolving member of the fingertip part is linked to the linking member.

13. The multi-joint finger unit according to claim 12, wherein the joint axle is a hollow joint axle comprising a hollow part for wiring.

14. The multi-joint finger unit according to claim 12, wherein the rotating member of the fingertip part is a cylindrical outer casing of the fingertip part.

15. The multi-joint finger unit according to claim 12, wherein a drill, driver bit, or other operating tool is coaxially mounted on the rotating member of the fingertip part.

16. A multi-finger grasping mechanism having a plurality of multi-joint finger units, wherein each of the multi-joint finger units is the multi-joint finger unit according to claim 12.

17. The multi-finger grasping mechanism according to claim 16, comprising: at least three of the multi-joint finger units; and a common finger unit mounting plate on which the multi-joint finger units are supported.

18. A multi-finger grasping mechanism having a plurality of finger units, wherein at least one of the finger units comprises: a finger root part, a fingertip part, and a joint part for linking the finger root part and the fingertip part; wherein the joint part supports the fingertip part revolvably around a joint axial line that is orthogonal to a center axis of the fingertip part; the finger root part comprises a joint driving actuator for revolving the fingertip part around the joint axial line; and the fingertip part comprises a revolving member that is supported in a revolvable state by the joint part, a rotating member that is supported in a state of rotation around the center axis of the fingertip part by the revolving member, and a rotation drive actuator for rotating the rotating member, wherein the rotation drive actuator is supported by the revolving member, and a drill, driver bit, or other operating tool is coaxially mounted on the rotating member of the fingertip part.

19. A multi-finger grasping mechanism having a plurality of multi-joint finger units, wherein at least one of the multi-joint finger comprises: a finger root part, a finger intermediate part, a fingertip part, a finger-root-side joint part for linking the finger root part and the finger intermediate part, and a fingertip-side joint part for linking the finger Intermediate part and the fingertip part; wherein the finger-root-side joint part supports the finger intermediate part revolvably around a joint axial line that is orthogonal to a center axis of the finger intermediate part; the finger root part comprises a finger-root-side joint driving actuator for revolving the finger intermediate part around the joint axial line; the fingertip-side joint part supports the fingertip part revolvably around a joint axial line that is orthogonal to a center axis or the fingertip part; the finger intermediate part comprises a fingertip-side joint driving actuator for revolving the fingertip part around the joint axial line; and the fingertip part comprises a revolving member that is supported in a revolvable state by the fingertip-side joint part, a rotating member that is supported in a state of rotation around the center axis of the fingertip part by the revolving member, and a rotation drive actuator for rotating the rotating member, wherein the rotation drive actuator is mounted on the revolving member, and a drill, driver bit, or other operating tool is coaxially mounted on the rotating member of the fingertip part.

* * * * *